United States Patent [19]
Nakamura et al.

[11] Patent Number: 5,309,268
[45] Date of Patent: May 3, 1994

[54] OPTICAL COMMUNICATION SYSTEM AND OPTICAL COMMUNICATION METHOD

[75] Inventors: Kenji Nakamura, Hadano; Jun Nitta, Sagamihara, both of Japan

[73] Assignee: Canon Kabushiki Kaisha, Tokyo, Japan

[21] Appl. No.: 123,900

[22] Filed: Sep. 20, 1993

Related U.S. Application Data

[63] Continuation of Ser. No. 487,394, Mar. 2, 1990, abandoned.

[30] Foreign Application Priority Data

Mar. 9, 1989 [JP] Japan .................................. 1-55067
Mar. 9, 1989 [JP] Japan .................................. 1-55068

[51] Int. Cl.⁵ ...................... H04B 10/00; H04B 10/02
[52] U.S. Cl. ................................ 359/154; 359/160; 359/173; 359/176; 359/179
[58] Field of Search ............... 359/154, 134, 158, 160, 359/162, 173, 176, 179, 188, 182, 184, 195

[56] References Cited

U.S. PATENT DOCUMENTS

| | | | |
|---|---|---|---|
| 3,435,230 | 3/1969 | Courtney-Pratt | 250/199 |
| 4,471,494 | 9/1984 | Keil et al. | 359/182 |
| 4,481,676 | 11/1984 | Eumurian et al. | 359/154 |
| 4,504,975 | 3/1985 | jarret et al. | 319/162 |
| 4,775,972 | 10/1988 | Ih et al. | 359/191 |
| 4,882,771 | 11/1989 | Rocks | 359/191 |
| 4,928,318 | 5/1990 | Ibe et al. | 359/182 |

FOREIGN PATENT DOCUMENTS

| | | | |
|---|---|---|---|
| 0247834 | 12/1987 | European Pat. Off. | |
| 0305995 | 3/1989 | European Pat. Off. | |
| 0319242 | 6/1989 | European Pat. Off. | 310/3 |
| 1566955 | 2/1971 | Fed. Rep. of Germany | |
| 0086929 | 5/1985 | Japan | 359/174 |
| 0051733 | 2/1989 | Japan | 359/134 |

OTHER PUBLICATIONS

IEEE Journal of Quantum Electronics QE-18:9:13-51-61 (Sep. 1982).
Applied Physics Letters 51:2:94-96 (Jul. 1987).

Primary Examiner—Richard E. Chilcot, Jr.
Assistant Examiner—Kinfe-Michael Negash
Attorney, Agent, or Firm—Fitzpatrick, Cella, Harper & Scinto

[57] ABSTRACT

In an optical communication system, a transmitted signal is modulated with a subcarrier signal having a frequency higher than the frequency of said transmitted signal on the transmission side, the modulated signal light emitted to a transmission channel. On the reception side, the received signal is filtered and decoded by means of a band-pass filter having a center frequency approximately equal to the frequency of the subcarrier signal of the received signal. The above arrangement makes it possible to achieve an arrangement free from the influence of deterioration in the degree of modulation due to spontaneous emission generated from an optical amplifier disposed midway along the transmission channel. The optical amplifier may be an optical differential gain amplifier which has the differential-gain optical input/output characteristics of outputting spontaneous emission of low intensity according to a digital signal value "0" and output light of high intensity according to a digital signal value "1". The arrangement enables optical amplification of signal light without the risk of outputting high-level spontaneous emission due to direct current excitation. It is therefore possible to provide received signals of high quality by eliminating any deterioration in S/N ratio and any deterioration of the degree of modulation of signal light due to spontaneous emission from the optical amplifier disposed midway along the transmission channel.

12 Claims, 5 Drawing Sheets

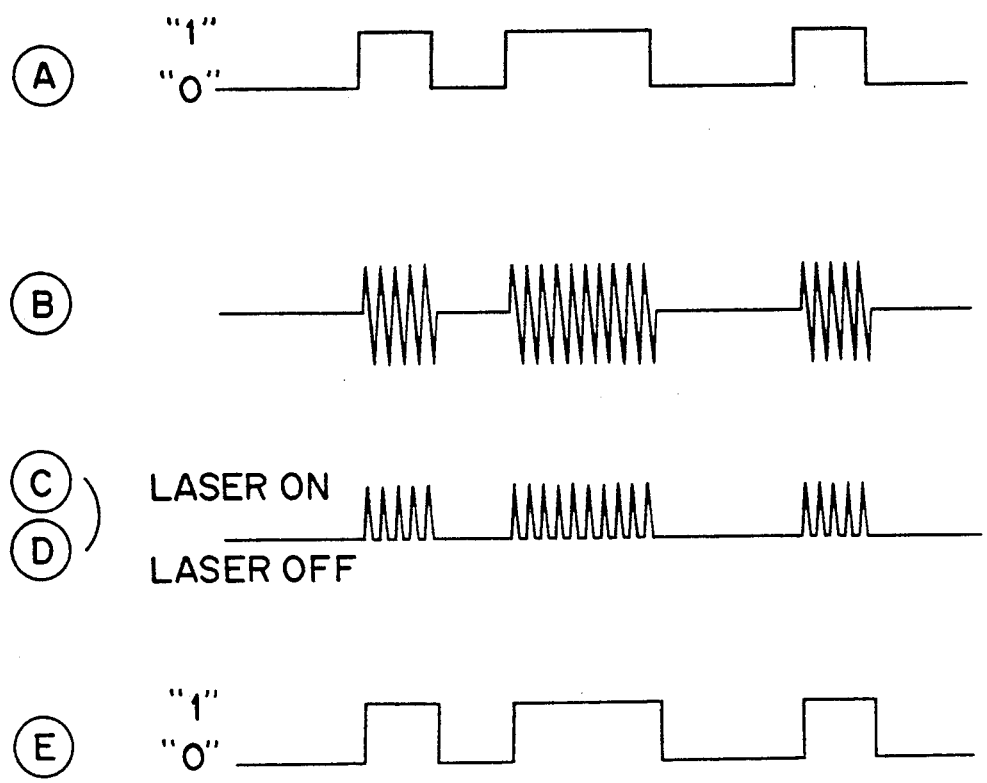
F I G. 2

OPTICAL COMMUNICATION SYSTEM AND OPTICAL COMMUNICATION METHOD

This application is a continuation of application Ser. No. 07/487,394 filed Mar. 2, 1990, now abandoned.

BACKGROUND OF THE INVENTION

1. Field of the Invention

The present invention relates generally to an optical communication system and, more particularly, to an optical communication system in which an optical amplifier is disposed midway along a transmission channel or at one end thereof, and an optical communication method for use with the same.

The present invention also relates to an optical communication system which provides optical communication through an optical communication channel provided with at least one optical differential gain amplifier.

2. Description of the Related Art

In an optical communication system of the type which utilizes an optical fiber as an optical transmission channel or, optical spatial propagation, as an optical transmission channel, the attenuation of an optical signal over the transmission channel leads to a deterioration in the signal/noise ratio (S/N ratio) of the optical receiver. The result is deterioration in the quality of the received signal and impairment of the reliability of the optical transmission itself. For this reason, the attenuation of the optical signal presents significant problems.

To cope with the above problems, one method is considered. In this method, an optical fiber whose attenuation of optical signals is reduced is used as an optical transmission channel, and an optical amplifier is disposed midway along the optical fiber so as to amplify and retransmit the signal light.

FIG. 6 shows a conventional type of optical communication system provided with such an optical amplifier. As shown in FIG. 6, the conventional optical communication system is arranged so that a transmitted digital signal 5 is input to a laser driving circuit 12. A semiconductor laser 13 is turned on or off in accordance with whether the value of the transmitted digital signal 5 is a "1" or a "0". A laser light signal, which is emitted when the semiconductor laser 13 is on, is transmitted to an optical amplifier 43 over an optical fiber 41. The optical amplifier 43 amplifies the light intensity which has been attenuated due to transmission over the optical fiber 41, and assures the required light intensity. The light output from the optical amplifier 43 is transmitted over an optical fiber 42 and is incident on an optical detector 21. The incident light is converted by the optical detector 21 into an electrical signal corresponding to the incident light intensity. The received light signal is amplified and delivered as a received signal 6 by an amplifier 22. In FIG. 6, there are also shown examples of transmission signal waveforms.

However, the optical amplifier 43 used in the aforesaid conventional optical communication system entails a number of problems. For example, the optical amplifier 43 not only effects optical amplification of signal light but also outputs high-level spontaneous emission due to direct current excitation. The result is a deterioration in the S/N ratio or the quenching ratio due to spontaneous emission and it has therefore been impossible to realize satisfactory transmission quality.

More specifically, the signal output from the optical amplifier 43 encounters the following problems: 1) The degree of optical modulation (on-off ratio) deteriorates with respect to the input light; and 2) So-called beat noise occurs due to interference between the input signal light and the high-level spontaneous emission due to direct current excitation, and this leads to a deterioration in the S/N ratio.

SUMMARY OF THE INVENTION

It is therefore an object of the present invention to provide an optical communication system which is capable of providing received signals of improved quality by eliminating any deterioration in S/N ratio and any deterioration of the degree of modulation of signal light due to spontaneous emission from an optical amplifier, and to provide an optical communication method for use with such an optical communication system.

To achieve the above object, according to one aspect of the present invention, there is provided an optical communication system in which an optical amplifier is disposed at at least one selected from among the optical transmission end of an optical transmission channel, an intermediate portion of the optical transmission channel and the optical reception end of the optical transmission channel. Such a system includes modulating means for modulating a transmitted signal with a subcarrier signal having a frequency higher than the transmitted signal, optical output means for emitting a modulated signal supplied from the modulating means into the transmission channel as a corresponding optical output, receiving means for converting light received from the transmission channel into a corresponding electrical signal, filter means for filtering the signal received by the receiving means by using the modulating subcarrier signal frequency of the modulating means as an approximate filtering center frequency, and demodulating means for demodulating the signal filtered by the filtering means.

In the above arrangement, optical communication is effected by using an optical signal modulated with the subcarrier frequency higher than the frequency of the transmitted signal during transmission of the optical signal. Accordingly, it is possible to provide received signals of high quality by eliminating any deterioration in S/N ratio and any deterioration of the degree of modulation of signal light due to spontaneous emission from the optical amplifier.

According to another aspect of the present invention, there is provided an optical communication system which comprises optical output means for emitting an optical output corresponding to a digital output signal, receiving means for receiving light emitted from the optical output means, an optical communication channel made from an optical transmission channel for transmitting the light emitted from the optical output means to the receiving means, and at least one optical differential gain amplifier disposed on the optical communication channel. The optical differential gain amplifier has the differential-gain type optical input/output characteristic of providing spontaneous emission of extremely reduced intensity according to a digital signal value "0" and output light of extremely increased intensity according to a digital signal value "1". In the above arrangement, the optical differential gain amplifier is an oscillation type differential gain amplifier whose optical threshold is set to an intermediate approximate intensity between the values "1" and "0" of optical digital signals. The arrangement outputs a weak spontaneous emission in response to an optical digital signal denoting a "0" and high-intensity laser light in response to an optical digital signal denoting a "1", thereby eliminating any deterioration in S/N ratio and quenching ratio due to spontaneous emission, as with a progressive type of optical amplifier, and providing improved transmission quality.

The above and other objects, features and advantages of the present invention will be apparent from the following description of preferred embodiments of the invention with reference to the accompanying drawings.

BRIEF DESCRIPTION OF THE DRAWINGS

FIG. 2 is a diagram showing the waveforms of an electrical signal and an optical signal, taken at the points A-E of FIG. 1 in the first embodiment;

DESCRIPTION OF THE PREFERRED EMBODIMENTS

Embodiments of the present invention will be described in detail below with reference to the accompanying drawings.

Figure 1:
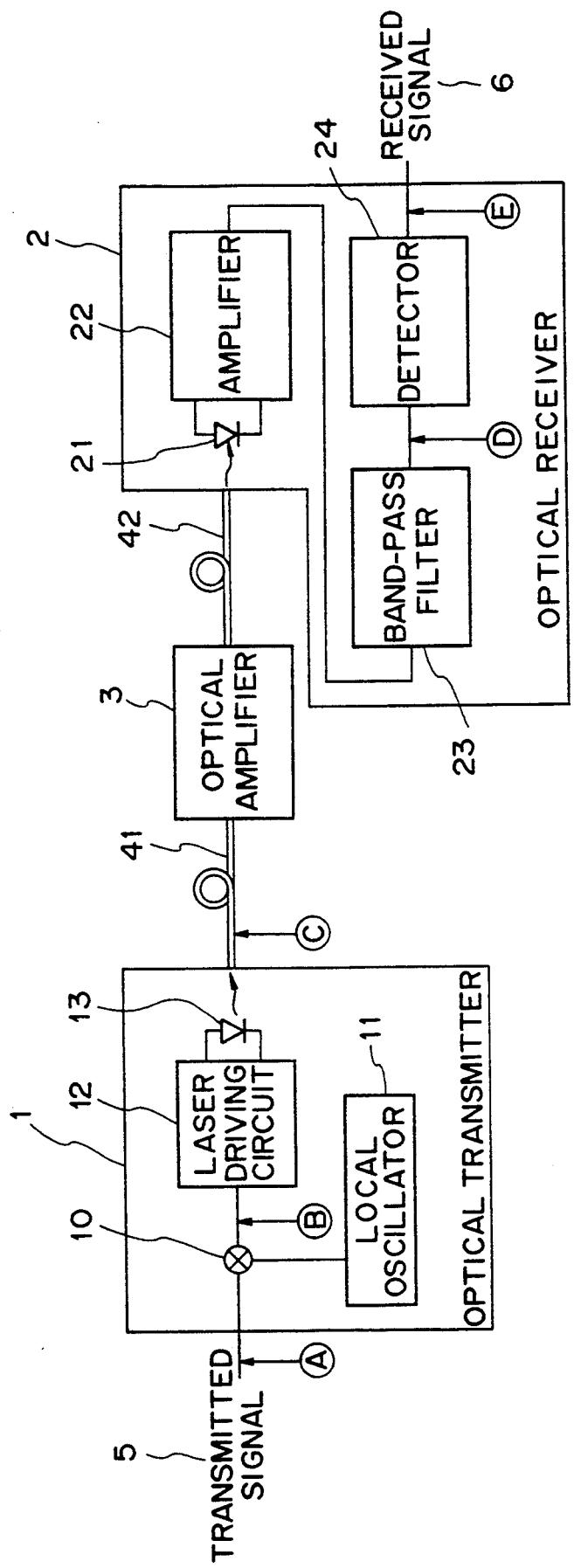
FIG. 1 is a conceptual diagram of an optical communication system according to a first embodiment of the present invention.

FIG. 1 is a block diagram of a first embodiment which represents the features of the present invention in the best mode. The illustrated embodiment essentially comprises an optical transmitter 1, an optical receiver 2, an optical amplifier 3 and optical fibers 41 and 42 serving as optical transmission channels. A transmitted signal and a received signal are denoted by 5 and 6, respectively.

The optical transmitter 1 includes a mixer 10, a local oscillator 11 for generating a subcarrier signal as a predetermined high-frequency signal, a laser driving circuit 12 for turning on or off a semiconductor laser 13 in accordance with whether the input signal is a "1" or a "0", and the semiconductor laser 13. The light emitted from the semiconductor laser 13 is made incident upon the optical fiber 41 and transmitted to the optical amplifier 3 therethrough.

The optical receiver 2 comprises the following major elements: an optical detector 21 made from, for example, a PIN type photodiode for converting the incident light from the optical fiber 42 into a corresponding electrical signal; an amplifier 22 for amplifying the electrical signal from the optical detector 21; a band-pass filter 23 having a center frequency equal to the frequency of the subcarrier signal generated from the local oscillator 11; and a detector 24.

The traveling wave semiconductor amplifier disclosed in Japanese Patent Publication No. 57/6715 may be suitably used for the optical amplifier 3 in the first embodiment.

The operation of the first embodiment having the aforesaid arrangement will be explained below with reference to FIG. 2.

FIG. 2 is a conceptual diagram showing the waveforms of the electrical or optical signals provided at the points shown at A, B, C, D and E in FIG. 1.

The transmitted signal 5 provided at point A, which is a binary signal denoting "1" or "0" according to the data transmitted, is input to the optical transmitter 1 in the form shown in, for example, part A of FIG. 2. The mixer 10 mixes the transmitted signal 5 with the subcarrier signal of a predetermined frequency (high frequency) which is generated from the local oscillator 11, thereby providing the modulated signal shown in part B of FIG. 2. This modulated signal is input to the laser driving circuit 12. The laser driving circuit 21 turns on or off the semiconductor laser 13 in accordance with the modulated signal, thereby modulating an optical signal output. As is known, since the semiconductor laser 13 emits light only when a forward voltage is applied, the optical output from the semiconductor laser 13 is as shown in part C of FIG. 2. The light emitted from the semiconductor laser 13 propagates down the optical fiber 41 to the optical amplifier 3. The optical amplifier 3 amplifies the incident light to light having a predetermined intensity and outputs it to the optical fiber 42. The light propagates over the optical fiber 42 to the optical detector 21 of the optical receiver 2.

The light incident on the optical detector 21 is converted into an electrical signal corresponding to the intensity of the received light by the detector 21. After the electrical signal has been amplified, it is transmitted to the band-pass filter 23. The band-pass filter 23 is, as described above, a band-pass filter having a predetermined frequency band centered around the modulation frequency used on the transmitter side (or frequency of the subcarrier signal generated by the local oscillator 11). The band-pass filter 23 eliminates unwanted signal components such as noise components other than the subcarrier signal. The subcarrier signal alone is transmitted to the detector 24 for the purpose of envelope detection, and is decoded into the original frequency signal. The decoded signal is output as the received signal 6 shown in part E of FIG. 2 which is approximates the transmitted signal 5.

In the first embodiment, spontaneous emission is still combined with the output from the optical amplifier 3, and a significant influence is exerted over the output from the optical detector 21. As a result, the output from the optical amplifier 22 deteriorates in the degree of modulation and S/N ratio with respect to the transmitted signal 5. However, the electrical frequency spectrum of the spontaneous emission from the optical amplifier 3 is in the form in which white noise is combined with direct current, and even after the optical signal has been converted into an electrical signal, a similar form of frequency spectrum remains. Accordingly, a substantial portion of the noise signal power due to spontaneous emission does not pass through the band-pass filter 23.

In contrast, the optical signal transmitted from the optical transmitter 1 is subjected to modulation using the subcarrier signal from the local oscillator 11, and the center frequency of the spectrum is coincident with the center frequency of the band-pass filter 23. Thus, this modulated signal power can substantially pass through the band-pass filter 23.

Accordingly, the output signal from the band-pass filter 23 is of improved quality which is free from the influence of spontaneous emission as shown in part D of FIG. 2. Therefore, the signal obtained by envelope-detection of the signal of part D approximately coincides with the input signal of the optical transmitter 1 as shown in part E of FIG. 2, whereby output signals which excel in the degree of modulation and S/N ratio can be obtained.

Although the first embodiment of the present invention has been explained with reference to FIG. 1, the present invention is not limited to the above-described one. For example, although the optical fiber communication system using an optical fiber as its optical transmission channel has been explained in connection with FIG. 1, the present invention can also be applied to spatial propagation optical communications. In this case, it suffices to provide an optical amplifier at at least either the output of the optical transmitter or the input of the optical receiver.

The first embodiment of FIG. 1 is shown as a unilateral communication system in which an optical transmitter is disposed on one side of a transmission channel with an optical receiver disposed on the other side of the transmission channel. The present invention can also be applied to a bilateral communication system which has an optical transmitter and an optical receiver on each end of the transmission channel so that an optical signal is separated and mixed at each end of the transmission channel.

In addition, although the first embodiment has been explained with reference to the communication between two points, the present invention can also be effectively applied to a so-called optical communications network in which communication channels are provided among three points or more to realize communications between arbitrary two points or more by means of exchange or the like.

The first embodiment has been explained with reference to the optical communication system in which the optical transmitter is provided with only one light source. However, it is apparent that the present invention can be applied to a so-called wavelength-multiplex optical communication system in which the optical transmitter is provided with a synthesizer and a plurality of light sources having different wavelengths, while the optical receiver is provided with a wavelength divider, so that a plurality of signals are communicated at the same time.

It will be appreciated from the foregoing that, according to the first embodiment, there is provided an optical communication system employing an optical amplifier, which system can achieve improved transmission quality by eliminating any deterioration in S/N ratio and any deterioration of the degree of modulation due to spontaneous emission from the optical amplifier by means of a simplified arrangement. This arrangement is constructed to multiplex an input signal with a subcarrier signal and transmit the modulated signal, filter the received signal by means of a band-pass filter having a center frequency approximately equal to the frequency of the subcarrier signal, and detects the envelope of the filtered signal.

The foregoing is an explanation of the first embodiment in which any deterioration in S/N ratio and any deterioration of the degree of modulation due to spontaneous emission from the optical amplifier is eliminated by means of the simplified arrangement which is constructed to multiplex an input signal with a subcarrier signal and transmit the modulated signal, filter the received signal by means of a band-pass filter having a center frequency approximately equal to the frequency of the subcarrier signal, and detect the envelope of the filtered signal. However, the arrangement for eliminating any deterioration in S/N ratio and any deterioration of the degree of modulation due to spontaneous emission from the optical amplifier is not limited to the above-described one. For example, it is also possible to achieve improved transmission quality by means of an arrangement which outputs weak spontaneous emission in response to an optical digital signal denoting a "0" and high-intensity laser light in response to an optical digital signal denoting a "1", thereby eliminating any deterioration in S/N ratio and quenching ratio due to spontaneous emission, as with a progressive type of optical amplifier.

A second embodiment of the present invention having the aforesaid arrangement will be explained below in detail.

Figure 3:
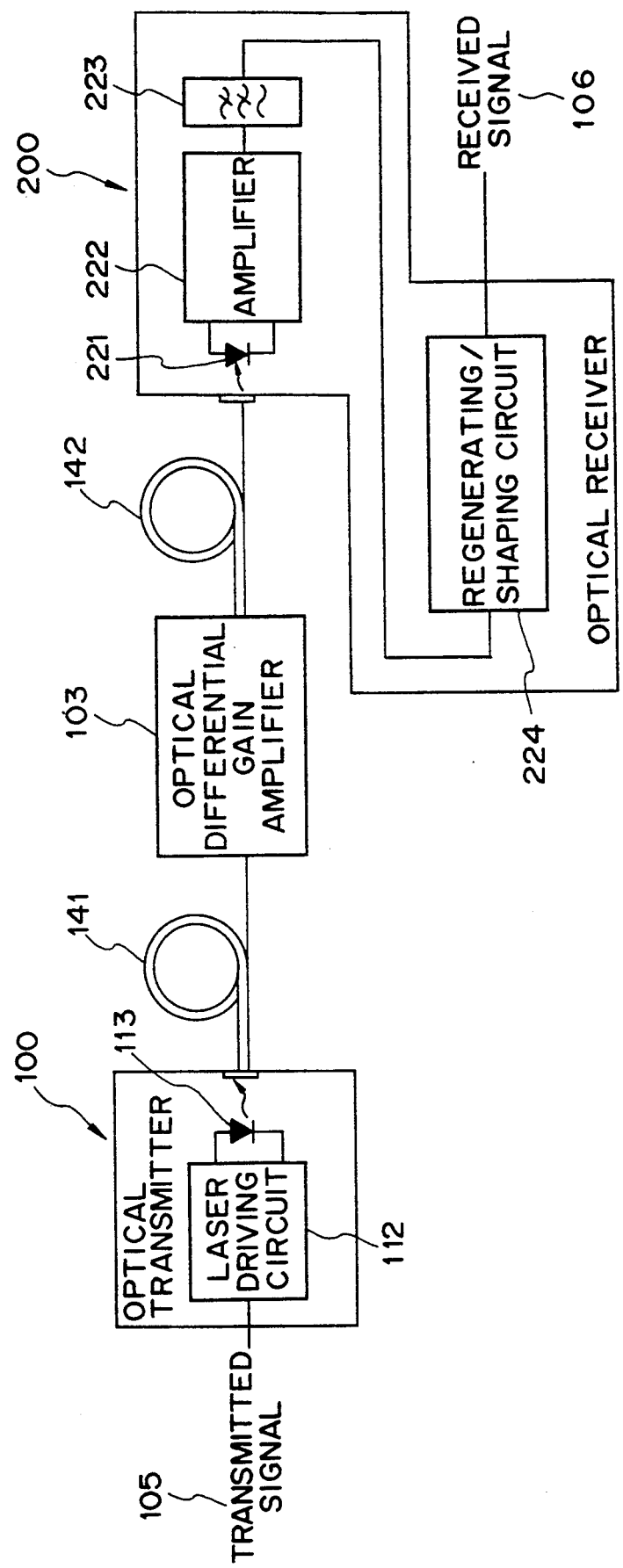
FIG. 3 is a conceptual diagram of an optical communication system according to a second embodiment of the present invention.

FIG. 3 is a block diagram which represents the features of the second embodiment of the present invention in the best mode. The illustrated second embodiment essentially comprises an optical transmitter 100, an optical receiver 200, an optical differential gain amplifier 103 having optical input/output characteristics of the differential gain transfer type, and optical fibers 141 and 142 serving as optical transmission channels. The optical threshold of the optical differential gain amplifier 103 is set to an appropriate intermediate light intensity between the values "1" and "0" of optical digital signals so that weak spontaneous emission is delivered in response to an optical digital signal denoting a "0" with high-intensity laser light delivered in response to an optical digital signal denoting a "1". A transmitted signal and a received signal are denoted by 105 and 106, respectively.

The optical transmitter 100 includes a laser driving circuit 113 for turning on or off a semiconductor laser 113 in accordance with whether the transmitted signal 105 is a "1" or a "0", and the semiconductor laser 113. The light emitted from the semiconductor laser 113 is made incident upon the optical fiber 141 and transmitted to the optical differential gain amplifier 103.

The optical receiver 200 comprises the following major elements: an optical detector 221 made from, for example, a PIN type photodiode for converting the incident light from the optical fiber 142 into a corresponding electrical signal; an amplifier 222 for amplifying the electrical signal from the optical detector 221; a low-pass filter 223; and a detector 224 for regenerating and shaping a waveform.

The optical differential gain amplifier 103 employed in the second embodiment is arranged to provide optical input/output characteristics of the differential gain transfer type by utilizing adjustment of the injection current of a bistable laser, as described in "Bistability and Pulsations in Semiconductor Lasers with Inhomogenous Current Injection", reported by "C. HARDER" in "IEEE JOURNAL OF QUANTUM ELECTRONICS Vol. QE-18, No. 9" of 1982, pp. 1351-1361.

The operation of the second embodiment having the aforesaid arrangement will be explained below.

The transmitted signal 105 is input to the laser driving circuit 113 as a binary digital signal. The laser driving circuit 113 generates a current pulse signal proportional to whether the transmitted signal 105 is a "1" or a "0", and supplies it to the semiconductor laser 113.

The semiconductor laser 113 outputs an optical digital signal corresponding to the transmitted signal 105, and the optical signal output is conducted to the optical differential gain amplifier 103 through the optical fiber 141.

The optical differential gain amplifier 103 is adjusted in the following manner in order to provide optical input/output characteristics of the differential gain function type based on the above-described adjustment of the injection current of the bistable laser. The optical threshold of the optical differential gain amplifier 103 is set to an appropriate intermediate light intensity between the values "1" and "0" of optical digital signals (for example, a light intensity equal to approximately the middle between "1" and "0" represented by the optical digital signals of the received light) so that weak spontaneous emission is delivered in response to an optical digital signal denoting a "0" with high-intensity laser light delivered in response to an optical digital signal denoting a "1". With this arrangement, it is possible to amplify the optical signal without deteriorating the quenching ratio. The optical output from the optical differential gain amplifier 103 is conducted to the optical receiver 200 through the optical fiber 142.

The optical signal, passed through the optical fiber 142, is input to the optical receiver 200. The incident light is converted by the optical detector 221 into an electrical signal corresponding to the incident light intensity and is then amplified by the amplifier 222. The low-pass filter 223 eliminates the signals contained in an unwanted band, and the output from the low-pass filter 223 is subjected to waveform shaping in the waveform regenerating and shaping circuit 22. The circuit 22 outputs the received signal 106 similar to the transmitted signal 105.

In the second embodiment described above, the optical differential gain amplifier 103 is arranged as an oscillation type differential gain amplifier, and the optical threshold of this optical amplifier is set to an appropriate intermediate light intensity between the values "1" and "0" of optical digital signals. It is therefore possible to output weak spontaneous emission in response to an optical digital signal denoting a "0" and high-intensity laser light in response to an optical digital signal denoting a "1".

Accordingly, it is possible to provide a highly reliable optical communication system which can effect optical amplification of signal light without the risk of outputting high-level spontaneous emission due to direct current excitation.

It is therefore possible to accomplish an optical communication system having excellent reliability by performing optical communication utilizing the above optical amplifier disposed midway along an optical transmission channel.

Although the second embodiment has been explained with reference to the example in which the differential gain optical amplifier is disposed midway along the optical fiber as an optical amplifier, the present invention is not limited to the above-described second embodiment, either. The present invention may utilize an arrangement employing a GaAs Fabri-Perot etalon as a third embodiment.

Figure 4:
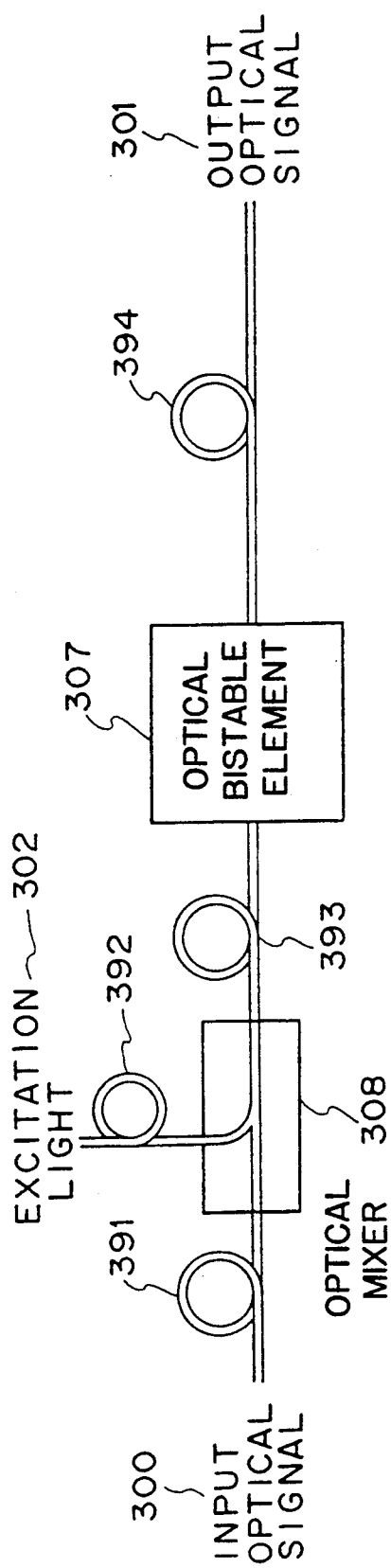
FIG. 4 is a conceptual diagram of an optical communication system according to a third embodiment of the present invention.

FIG. 4 shows an arrangement in which the GaAs Fabri-Perot etalon is employed as a differential-gain type optical amplifier unit.

The arrangement shown in FIG. 4 comprises a bistable element 307 of the etalon type made from, for example, GaAs, an optical mixer 308, and optical fibers 391-394. An input optical signal and an output optical signal are denoted by 300 and 301, respectively.

Figure 5:
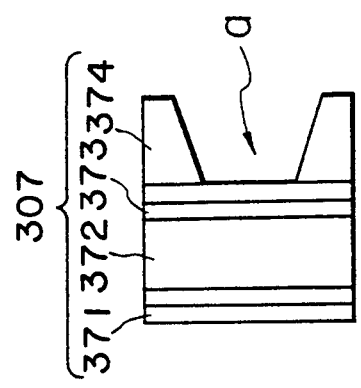
FIG. 5 is a conceptual diagram showing in detail the structure of a bistable element according to the third embodiment of the present invention.
Figure 6:
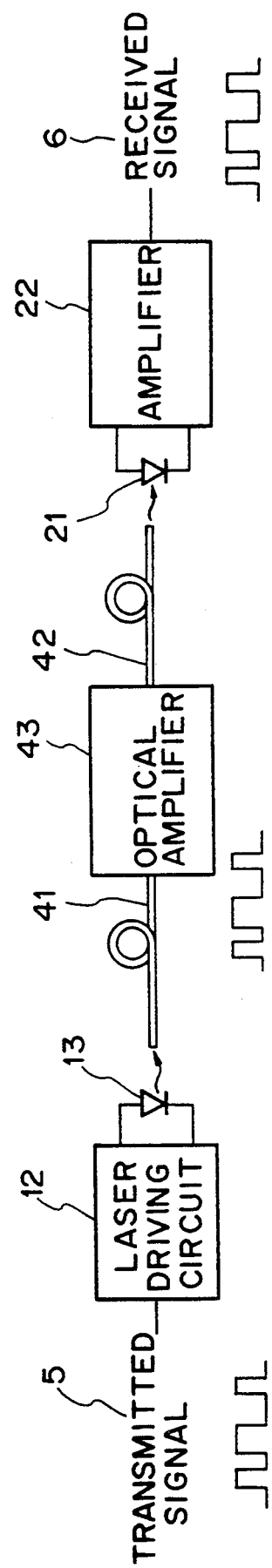
FIG. 6 is a conceptual diagram showing a conventional type of optical communication system.

FIG. 5 shows in detail the structure of the optical bistable element 307 used in the third embodiment.

The optical bistable element 307 used in the third embodiment has a structure such as that described in, for example, *Applied Physics Letters* of 1987, Vol. 51, No. 2, pp. 94-96, the paper entitled "GaAs-AlAs monolithic microresonator arrays", by J. L. Jewell et al.

The optical bistable element 307 comprises a DBR mirror 371 including a total of seven pairs of AlAs/GaAs elements, a GaAs light emitting element 372 having a thickness of 2 $\mu$m, a DBR mirror 373 including a total of nine pairs of AlAs/GaAs elements, and a GaAs substrate 374. The GaAs substrate 374 is provided with an opening a having a predetermined diameter so as to effect a light transmitting operation.

In the third embodiment having the above-described features, the input optical signal 300 and excitation light are synchronously input to the optical bistable element 307.

The optical bistable element 307 is set to exceed its optical threshold and exhibit high transmittance only when it receives the input optical signal 300 and the excitation light 102 at the same time. Accordingly, only when receiving a digital signal denoting a "1", the optical bistable element 307 outputs high-intensity light as the output optical signal 301 but, in the case of a digital signal denoting a "0", the element 307 does not provide the output optical signal 301.

Accordingly, it is possible to provide a highly reliable optical communication system which can achieve optical amplification of signal light without the risk of outputting high-level spontaneous emission due to direct current excitation and without any deterioration in the quenching ratio or S/N ratio of the signal.

It is therefore possible to accomplish an optical communication system having excellent reliability by performing optical communication utilizing the above optical amplifier disposed midway along an optical transmission channel.

As is apparent from the foregoing, there is provided an optical communication system employing an optical amplifier disposed along an optical transmission channel, which system can achieve improved transmission quality by using a differential gain optical amplifier as the optical amplifier to eliminate any deterioration in S/N ratio and quenching ratio due to spontaneous emission which has otherwise been experienced with a progressive-wave type optical amplifier.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical communication system for communicating between a transmission side and a reception side, comprising:

optical output means, disposed on the transmission side, for either turning on or off an optical output in accordance with a binary signal and emitting the optical output into a first optical transmission channel of the transmission side;

receiving means, disposed on the reception side, for receiving an optical signal from a second optical transmission channel; and optical intermediate means, disposed between said first and second optical transmission channels, for transferring light to said second optical transmission channel, said light being generated in accordance with an optical input from said first optical transmission channel, said optical intermediate means comprising an optical differential gain amplifier;

wherein said optical intermediate means provides spontaneous emission of reduced intensity in a case where the optical input is less than a predetermined threshold and outputs light of increased intensity in a case where the optical input is not less than the predetermined threshold.

2. An optical communication system according to claim 1, wherein said optical output means emits the optical output into said first optical transmission channel by means of a semiconductor laser.

3. An optical communication system according to claim 1, wherein said optical intermediate means has a bistable laser.

4. An optical communication system according to claim 1, wherein said optical first and second transmission channels includes an optical fiber.

5. An optical communication system for communicating between a transmission side and a reception side, comprising:

optical output means, disposed on the transmission side, for either turning on or off optical signal in accordance with a digital signal and emitting the optical signal into a first optical transmission channel;

receiving means, disposed on the receiving side, for receiving light from a second optical transmission channel; and optical bistable element means, disposed between said first and second optical transmission channels, for emitting light into said second optical transmission channel in a case where the optical signal is equal to or above a predetermined level, wherein said optical bistable element means comprises supply means for supplying the optical signal and excitation light simultaneously.

6. An optical communication system according to claim 5, wherein said optical output means emits said optical signal into said first optical transmission channel by means of a semiconductor laser.

7. An optical communication system according to claim 5, wherein said optical bistable element means is set to exceed its optical threshold and exhibit high transmittance when said optical signal and excitation light from excitation light inputting means are input to said optical bistable element means at the same time.

8. An optical communication system according to claim 5, wherein said digital signal to be transmitted is a bilevel signal which consists of a digital signal value "0" and a digital signal value "1".

9. An optical communication system according to claim 5, wherein said optical first and second transmission channels includes an optical fiber.

10. An optical communication system according to claim 5, wherein said supply means comprises an optical mixer.

11. An optical communication system according to claim 5, wherein said optical bistable element means comprises an etalon-type optical bistable element composed of GaAs.

12. An optical communication system according to claim 5, wherein said optical bistable element means emits the light into said second optical transmission channel in a case where the optical signal equal to or above the predetermined level is supplied simultaneously with the excitation light supplied by said supply means.

* * * * *

UNITED STATES PATENT AND TRADEMARK OFFICE
CERTIFICATE OF CORRECTION

PATENT NO. : 5,309,268
DATED : May 3, 19944
INVENTOR(S) : KENJI NAKAMURA, ET AL.

It is certified that error appears in the above-identified patent and that said Letters Patent is hereby corrected as shown below:

ON TITLE PAGE

In [56] References Cited, under U.S. PATENT DOCUMENTS:
"jarret et al." should read --Jarret et al.--.

COLUMN 4

Line 16, "circuit 21" should read --circuit 12--.
Lien 44, "is" should be deleted.

COLUMN 9

Line 17, "plifier;" should read --plifier,--.
Line 34, "includes" should read --include--.

COLUMN 10

Line 28, "includes" should read --include--.

Signed and Sealed this

First Day of November, 1994

Attest:

BRUCE LEHMAN

Attesting Officer  Commissioner of Patents and Trademarks